Patented Nov. 30, 1948

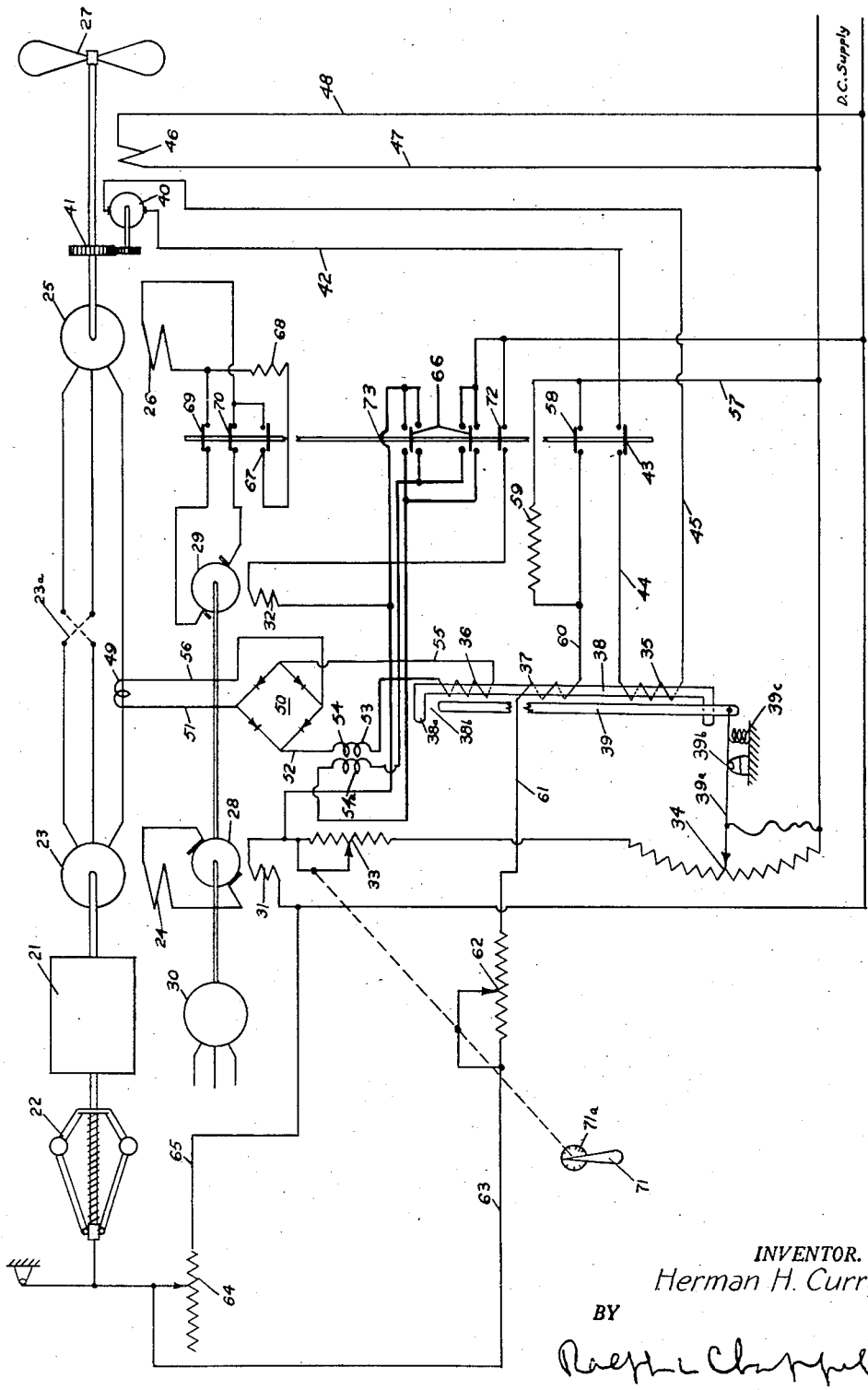

2,454,778

UNITED STATES PATENT OFFICE 2,454,778

ELECTRICAL CONTROL SYSTEM

Herman H. Curry, United States Coast Guard

Application June 7, 1945, Serial No. 598,180

14 Claims. (Cl. 318—147)

(Granted under the act of March 3, 1883, as amended April 30, 1928; 370 O. G. 757)

This invention relates generally to an automatic electrical control system, and more particularly to the use of such a system in connection with a Diesel-electric alternating-current marine-propulsion system in which a motor is supplied with energy from a generator driven by a variable-speed Diesel engine, and in which the motor operates in a synchronous speed range and in a speed range lower than that corresponding to synchronous operation at the lowest idling speed of the engine. In such a propulsion system the control system of this invention provides means for automatically maintaining a constant motor speed regardless of changing motor and propeller torque when operating in a subsynchronous speed range, for automatically supplying a stable field excitation at all current requirements of the motor when operating in a synchronous speed range, and for automatically unloading the engine should it tend to stall when operating in either speed range.

In applicant's Patent No. 2,231,521 of February 11, 1941 there is disclosed a method of operating a main propulsion motor at lower speed than that corresponding to synchronous operation at lowest idling speeds of engines by removing main-motor excitation, closing synchronous-motor field through a resistance, and operating as an induction motor on the combined characteristic torque curve of the squirrel-cage starting winding and that contributed by the synchronous field winding. In this speed range with the engine at idling speed, propeller speed is varied by varying the main-generator field excitation which determines A. C. voltage supplied the motor and thus the torque available from the motor. The motor operates at a speed corresponding to the intersection of curves of torque available from motor and torque required by propeller. In general this method of operation is satisfactory; however, it was found that varying motor torque as the vessel pitched caused variations in motor speed, especially at low speed, and limited the lowest speed obtainable.

Wide variations in propeller torque also occur, even at constant R. P. M., during the transient conditions found in maneuvers, or other abnormal conditions. Trouble at all speeds when using a Diesel electric propulsion system has been encountered from slow response of engine governors allowing excessive hunting and stalling of the engine under these conditions.

One object of this invention is to provide a system for controlling generator field as a function of propeller speed and of generator current to give an adjustable stable constant motor speed operation at speeds less than that corresponding to synchronous operation at minimum engine speed.

Another object is to provide a stability control during synchronous operation for increasing generator field with an increase in generator current or with an increase in current and motor speed.

A further object is to provide a control system for reducing generator field as the engine tends to stall below desired idling speed in either speed range.

A still further object is to provide a single field control unit for controlling generator field as a function of current, motor speed, and engine speed during both synchronous and subsynchronous operation.

Another object is to provide a means of adjusting such a field control unit so as to obtain the same maximum sensitivity at all speeds.

Another object is to provide a single automatic electrical control means for varying the current in an electrical circuit in response to a plurality of variables, and in which the current in the circuit may be selectively increased or decreased under the same set of conditions.

Further objects and advantages of this invention, as well as its construction, arrangement and operation, will be apparent from the following description and claims in connection with the accompanying drawing, which is a diagrammatic showing of a marine propulsion control system embodying the principles of this invention.

21 denotes a Diesel engine or other variable-speed prime mover, controlled by a governer 22, and driving the armature of an alternating current generator 23 having a field 24. The generator 23 energizes the armature of a synchronous motor 25 also provided with a suitable winding, which may consist of a conventional squirrel-cage starting winding or a phase wound starting winding, in addition to the armature winding and field winding 26, for operating asynchronously as an induction motor. The motor 25 drives a propeller 27 or other load device. A reversing switch 23a is placed in the lines between generator and motor.

Excitation of the generator field 24 and motor field 26 is accomplished through a motor generator set consisting of direct current generators 28 and 29, respectively, each of which is driven by a motor 30 or other source of mechanical energy. The fields 31 and 32 of these generators are in a parallel circuit and are excited by direct current from an external source (not shown) controlled by a manually operated rheostat 33 (which may be a bridge control device as disclosed in my above mentioned Patent No. 2,231,521) in series with a solenoid operated variable resistance 34.

The variable resistance 34 may be of the type often referred to as being a "silverstat." The "silverstat" employed in the present invention is operated by three solenoid coils 35, 36 and 37 about a common core 38 and armature system. The armature system comprises an armature element 39, of soft iron or other magnetic material, separated at one end from end 38a of the solenoid core 38 by an air gap 38b. Pivotally attached at the other end of element 39 is an arm 39a which is also pivotally attached to a stationary element as at 39b and is movable against the tension of a spring 39c. The armature element 39 moves in response to flux changes in the core 38 causing the arm 39a to move against the tension of the spring 39c and to thereby vary the resistance 34. The position of the element 39 depends upon the strength of the magnetic flux in the core 38. An increase in flux in the core 38 pulls the element 39 and arm 39a up against the tension of spring 39c causing arm 39a to increase the resistance 34; a decrease in flux in the core 38 allows the spring to pull the arm 39a and element 39 down thereby decreasing resistance 34. The flux in the core 38 depends upon the algebraic sum of the ampere turns in the coils 35, 36 and 37, i. e., if coil 37 is bucking coils 35 and 36, the operating flux in the core 38 depends upon the difference between the ampere turns in the coil 37 and the combined ampere turns of coil 35 and 36. Then with coil 37 bucking the coils 35 and 36 if the ampere turns of coil 37 are less than the combined ampere turns of coils 35 and 36, an increase in ampere turns in either of coils 35 and 36 will increase flux in the core 38 and cause the armature system to increase resistance 34. A decrease in ampere turns in coil 37 would also increase flux in the core. If the ampere turns in opposing coil 37 are greater than the combined ampere turns in coils 35 and 36 an increase in ampere turns in either of coils 35 or 36 will decrease total flux in the core and cause resistance 34 to be decreased. A device of this type operated by two opposing solenoids about separate cores was described in my Patent 2,238,627. Optionally, an electronic amplifying system can be substituted for the "silverstat," or control fields corresponding to the solenoid coils in an amplifying generator, such as a Westinghouse "rototrol" or General Electric "amplidyne" may be used.

Solenoid coil 35 is responsive to the speed of the propulsion motor 25 and is energized by direct-current tachometer generator 40 geared or otherwise connected to the propeller shaft as at 41. The circuit can be traced from the generator 40 through conductor 42, contact 43, conductor 44, coil 35, and conductor 45 back to the generator 40. Field coil 46 of the generator 40 is excited from a constant direct-current supply through conductors 47 and 48. Optionally a permanent magnet can be used.

Solenoid coil 36 is responsive to main-generator current and is energized from current transformer 49 through rectifier 50. The circuit can be traced from the transformer 49 through conductor 51, rectifier 50, conductor 52, coil 53 of damping transformer 54 (explained below), solenoid coil 36, conductor 55, back through rectifier 50 and conductor 56 to the transformer 49.

Solenoid coil 37, referred to below as a biasing coil, opposes flux from coils 35 and 36 and is responsive both to engine speed and control position. This coil 37 is supplied from a constant-potential direct current source through conductor 57, contact 58 or resistance 59 depending upon the type of operation desired (explained below), conductor 60, coil 37, conductor 61, bridge-controlled variable resistance 62, conductor 63, governer-operated variable resistance 64, and back to the negative terminal of the D. C. supply line through conductor 65. The governer-controlled variable resistance 64 operates such that a slight decrease in the idling speed of the engine 21 causes a large increase in resistance.

Damping of the variable resistance or "silverstat" 34 is accomplished by conventional damping transformer 54 when operating synchronously. When operating subsynchronously this transformer may be disconnected but preferably the current is reversed through the transformer by the double-pole switch 66 when operating in the lower speed range. As explained below, flux reverses in the "silverstat" solenoid core 38 on changing from subsynchronous operation and a transformer connected for damping when operating synchronously will tend to cause hunting when operating the main motor subsynchronously unless either primary or secondary is reversed.

The damping transformer 54 operates only during transient conditions incident to a change in field excitation, i. e., a change in current in the exciter field circuits due to variation of "silverstat" resistance by solenoid coils 35, 36 or 37 causes a corresponding change in current through the primary 54a of the damping transformer which sets up a current in the secondary coil 53. This current acting through solenoid coil 36 sets up a flux in the core 38 opposing that which caused the initial change of resistance in the exciter field circuits, thereby preventing hunting of the armature element of the variable resistance on "silverstat" 34.

The resistance in the circuit through the damping transformer is great relative to that in the exciter field circuits so that no appreciable shorting out of the motor exciter field 32 occurs.

The main motor 25 is operated as an induction motor at subsynchronous speed by shorting out the motor field 26 through contact 67 and a resistance 68 of appropriate value. Change to synchronous operation is accomplished by opening the contact 67 and closing contacts 69 and 70 thus completing the circuit between the motor field 26 and exciter 29. This change over can be accomplished automatically when the motor 25 approaches synchronous speed with the generator 23 by the method disclosed in my Patent 2,231,521.

Speed control of the main motor 25 during subsynchronous operation is accomplished through control of the main generator field excitation by controlling the field 31 of the generator exciter 28 through variable resistance 33 and the variable resistance 34 or "silverstat" in series in the field circuit.

A control lever 71 is connected by means of suitable gearing or other expedient so as simultaneously to operate variable resistances 33 and 62. The dial 71a upon which the control lever 71 pivots is marked to indicate increments of speed and the control lever 71 is so calibrated with the variable resistance 33 such that for each speed setting of the control lever 71 the variable resistance 33 adjusts the exciter generator field 31 to approximately the correct value with the "silverstat" resistance 34 nearer the higher resistance position. As generator is operating at a constant idling speed in this motor speed range, varying main-generator excitation varies A. C. voltage supplied main motor and thus main motor slip. The control lever 71 is also calibrated with respect to the variable resistance 62 such that for each speed setting of the lever 71 the variable resistance 62 adjusts the ampere turns in the coil 37 to that value that will provide proper biasing of the ampere turns in the coils 35 and 36 to maintain the "silverstat" resistance 34 constant in its aforementioned higher resistance position during normal conditions of motor speed, generated current and engine speed. Variation of any of these factors then functions to change the total ampere turns of the coils 35, 36 and 37 setting up a changing flux in the core 38 and causing the "silverstat" resistance to change and thus vary the exciter field current, to maintain approximately constant speed of main motor 25.

Speed control of the main motor 25 during synchronous operation is accomplished by varying the speed of the prime mover 21. The speed-control lever 71 can be geared to an eccentric device (not shown) which is adapted to actuate a valve on the engine fuel supply line as in my Patent 2,231,521, or to vary governor speed setting in the conventional manner. During operation below synchronous speed the engine can be maintained at a constant idling speed by governor control. In the synchronous-speed range the "silverstat" 34 is adjusted to provide generator and motor field excitation consistent with stability at the speed set. This is accomplished by adjusting variable resistance 62 and shunting resistance 59 by contact 58 to provide biasing ampere turns in the solenoid coil 37 such that an increase in A. C. current from main generator 23 to main motor 25 will cause the "silverstat" in response to solenoid coil 36 to increase the generator and motor field excitation.

The solenoid coil 37 also causes the "silverstat" 34 to reduce generator excitation in response to governor 22 if the engine 21 tends to stall both in subsynchronous or synchronous operation. This unloads the engine and allows it to regain its normal speed.

An advantage of using a biasing coil for the speed adjustment rather than a variable resistance between the coil 35 and generator 40, for instance, is that a given change in speed of, for example 5 R. P. M., will cause the same change at either high or low speed in the voltage generated by the generator 40 and thus cause the "silverstat" to operate with the same sensitivity at all speed ranges. If a variable resistance were used between the coil 35 and the generator 40, the change in ampere-turns in the coil 35 and thus the sensitivity of the "silverstat" would be great at low speeds but so low at high speeds when greater resistance would be used as to render the "silverstat" comparatively insensitive.

A method of operation is as follows:

Contactor assembly 73 is placed in the "up" position opening contacts 69, 70, 72, and 58 and closing contacts 67 and 43. This closes the motor field 26 through resistance 68 and closes the circuit between generator 40 and solenoid coil 35.

The motor 75 now operates as an induction motor in a subsynchronous speed range. The motor speed is now adjusted to the approximate desired value by means of speed control lever 71 operating on variable resistance 33 and the ampere-turns in the coil 37 are correspondingly adjusted by resistance 62 to be slightly less than the combined ampere-turns of the coils 35 and 36 at the speed set. Under normal conditions the combined resistances 33 and 34 allow proper field excitation for the speed set.

Any increase in the current to the main motor 25 now causes an increase in ampere-turns in the coil 36. Likewise an increase in motor speed causes generator 40 to generate greater voltage and increases the ampere-turns in the coil 35. Increase of ampere-turns in the coils 35 and 36 causes an increase in flux in the "silverstat" core 38 which in turn actuates the "silverstat" so that resistance 34 in the exciter field is increased and generator field excitation is decreased. At the same time stalling of the engine 21 will, through governor-operated variable resistance 64, cause the ampere-turns in the opposing coil 37 to be decreased. A decrease in ampere-turns of the opposing coil 37 also causes an increase in flux in the "silverstat" core thus also causing "silverstat" to decrease generator excitation. Decrease in generator excitation unloads the engine 21. In subsynchronous operation increase in motor speed and increase in current to the motor act cumulatively to decrease main-generator excitation and thus maintain a stable speed of the value as determined by the position of control lever 71.

For normal synchronous operation the contactor assembly 73 is in the "down" position with contacts 69, 70, 72 and 58 closed and contacts 67 and 43 open. The main motor field 26 is now excited by current from exciter 29 and the ampere-turns of biasing coil 37 are increased by the shunting of resistance 59 through contact 58. The dial 71a is further marked to indicate proper setting of the control lever 71 to provide an approximately correct value of resistance of variable resistance 33 and "silverstat" resistance 34 to allow stable field excitation at the indicated increments of speed under normal operating conditions in the synchronous speed range. The control lever 71 is now set at the proper mark to provide approximately correct field excitation at the operating speed. The ampere-turns of the coil 37 are correspondingly adjusted by resistance 62 to be slightly greater than the ampere-turns of coil 36 (coil 35 having no effect as contact 43 to this coil is open). The total resistance of variable resistor 33 and "silverstat" resistance 34 is now such that stable field excitation is provided under normal operation at the desired speed. An increase in A. C. current will then increase ampere-turns in coil 36 reducing net ampere-turns and therefore flux in the "silverstat" core 38 and causing an increase in the main generator field excitation. Thus the "silverstat" acts as a conventional stability control and minimizes field heating by increasing the field only momentarily as required by varying propeller torque under heavy sea or other abnormal conditions. The heavy currents incident to maneuvering may tend to over-excite generator field. Under this condition, if engine 21 stalls, ampere-turns in coil 37 are greatly decreased by governor controlled resistance 64 allowing coil 36 to predominate to increase the flux in the core 38 and thereby reduce the generator field, unloading the engine.

Optionally, contact 43 can be arranged to be closed during normal synchronous operation with the ampere-turns of the coil 37 adjusted to be slightly greater than the combined ampere-turns of coils 35 and 36. In this case the stability regulator calibration, i. e. the calibration of control lever 71 with respect to variable resistance 62 to maintain the proper generator field for the speed set, is adjusted as a function of both control position and of motor speed through the biasing effect of coil 35. Under this operation variation of motor speed by variation of the speed of the prime mover will automatically cause adjustment of generator field excitation with the same setting of control lever 71.

The control system of this invention can be readily adapted for use in propulsion systems involving multiple arrangements of engines, generators and motors. Furthermore, although this control system is shown and described in connection with a marine propulsion set-up and is of great value when used therewith, the principles thereof can be adapted for automatic control in any electrical system where sensitive adjustable automatic control in response to a plurality of variables is desired.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a propulsion system including a prime mover, an alternating-current generator mechanically coupled thereto, a motor selectively operable as a synchronous and as an induction motor and energizable from said generator, and field windings for said generator and motor, said system being operable in a speed range extending above and below the synchronous speed of said motor corresponding to idling speed of the prime mover, the improvement comprising speed-control means including means for adjusting generator-field excitation to an approximately correct value for the desired speed, and automatic control means associated with said speed-control means and responsive to motor speed for regulating said generator-field excitation throughout the subsynchronous speed range to maintain said motor at substantially said desired speed.

2. In a propulsion system including a prime mover, an alternating-current generator mechanically coupled thereto, a motor selectively operable as a synchronous and as an induction motor and energizable from said generator, and field windings for said generator and motor, said system being operable in a speed range extending above and below the synchronous speed of said motor corresponding to idling speed of the prime mover, the improvement comprising speed control means including a speed-control lever for adjusting generator-field excitation to an approximately correct value for the speed desired, and automatic control means associated with said speed-control means and responsive to motor speed for regulating said generator-field excitation throughout the subsynchronous speed range to maintain a substantially constant motor speed corresponding to the position of the said speed-control lever.

3. In a propulsion system including a prime mover, an alternating-current generator mechanically coupled thereto, a motor selectively operable as a synchronous and as an induction motor and energizable from said generator, and field windings for said generator and motor, said system being operable in a speed range extending above and below the synchronous speed of said motor corresponding to idling speed of the prime mover, the improvement comprising speed-control means including a speed-control lever for adjusting generator-field excitation to an approximately correct value for the speed desired, and automatic control means associated with said speed-control means responsive to motor speed for regulating said generator-field excitation throughout the subsynchronous speed range whereby to maintain a substantially constant motor speed corresponding to the position of the said speed-control lever and responsive to current generated by said alternating-current generator throughout the synchronous speed range for automatically adjusting motor- and generator-field excitation to such values as are required to maintain stability for various current requirements during the latter speed range.

4. In a propulsion system including a prime mover, an alternating-current generator mechanically coupled thereto, a motor selectively operable as a synchronous and as an induction motor and energizable from said generator, and field windings for said generator and motor, said system being operable in a speed range extending above and below the synchronous speed of said motor corresponding to the idling speed of the prime mover, the improvement comprising speed-control means including a speed-control lever for manually adjusting generator-field excitation to an approximately correct value for the speed desired, and automatic control means associated with said speed-control means responsive to motor speed and to current generated for regulating said generator-field excitation throughout the subsynchronous speed range to maintain a substantially constant motor speed corresponding to the position of the said speed-control lever, said automatic control means also responsive to current generated and to motor speed throughout the synchronous speed range for automatically adjusting motor- and generator-field excitation to such values as are required to maintain stability for various current requirements during the latter speed range, and responsive in both speed ranges to engine speed for automatically decreasing generator-field excitation upon stalling of the engine.

5. In a propulsion system including a prime mover, an alternating-current generator mechanically coupled thereto, a motor selectively operable as a synchronous and as an induction motor and energizable from said generator, and field windings for said generator and motor, said system being operable in a speed range extending above and below the synchronous speed of said motor corresponding to the idling speed of the prime mover, the improvement comprising means for manually adjusting generator-field excitation to provide approximate speed desired within the subsynchronous speed range and to provide approximately such field excitation as is required for stability at operating speed within synchronous speed range, automatic field-control means associated with said manually-operated field-adjusting means and correlated therewith, said automatic field control means being responsive to motor speed and generated current to vary generator-field excitation so as to maintain constant speed corresponding to the position of the said manual adjusting means when operating in the subsynchronous speed range and so as to maintain field excitation at such values as are required to maintain stability when operating in the synchronous speed range.

6. In a propulsion system, in combination, a prime mover, an alternating-current generator mechanically coupled thereto, a motor selectively operable as a synchronous and as an induction motor and energizable from said generator, field windings for said motor and generator, separate exciters for each of said field windings, field windings for each of said exciters connected in parallel to a source of direct current, manually-operated exciter-field-control means, automatic exciter-field-control means associated with said manually-operated exciter-field-control means for varying field excitation as a function of motor speed, current generated, and engine speed, means for selectively securing a speed range for said motor extending above and below synchronous speed of said motor at idling speed of said prime mover, means associated with said selective means for reversing the operation of said automatic exciter-field-control means such that said automatic field-control means operates during synchronous speed range to increase field excitation with an increase in motor speed and generated current and during subsynchronous speed range operates to decrease field excitation with an increase in motor speed and generated current.

7. In an electrical control system including an electrical circuit, the improvement comprising a variable resistance in series connection in said circuit, and solenoid means including a plurality of coils about a common core-and-armature system operable to vary said resistance with change in flux in said core due to a change in total ampere-turns in said coils, the ampere-turns in at least one of said coils being responsive to changing electrical conditions, and the ampere-turns in another of said coils being selectively adjustable and arranged to oppose the ampere-turns in the said one coil and means for supplying direct current to said coils.

8. In an electrical control system including an electrical circuit, the improvement comprising a variable resistance in series connection in said circuit, and solenoid means including a plurality of coils about a common core-and-armature system operable to vary said resistance with change in flux in said core due to a change in total ampere-turns in said coils, the ampere-turns in at least one of said coils being responsive to changing electrical conditions, and the ampere-turns in another of said coils being selectively adjustable and arranged to oppose the ampere turns in the said one coil, means for supplying direct current to at least one of said coils to provide ampere-turns in one direction, and means for supplying direct current to another of said coils to provide ampere-turns in the opposite direction and selectively a greater or a less number of ampere turns than the number of ampere-turns provided by said one coil.

9. In a motor- and generator-field-control system, the improvement comprising a variable resistance in series connection with the field circuit, solenoid means including a plurality of coils about a common core-and-armature system operable to vary said resistance with change in flux in said core due to a change in total ampere turns in said coils, the ampere-turns in one of said coils being responsive to motor speed, the ampere-turns in another of said coils being responsive to current generated, a third of said coils being arranged to oppose the other two of said coils, and means for simultaneously adjusting the ampere-turns in said third opposing coil such that the ampere-turns in said third coil are selectively greater and less than the combined ampere-turns of the said other two coils and for selectively causing said motor to operate in the corresponding synchronous or subsynchronous speed range.

10. In a motor- and generator-field-control system, the improvement comprising a variable resistance in series connection in the field circuit, a motor, a plurality of solenoids operable to vary said resistance, one of said solenoids being responsive to motor speed, another of said solenoids being responsive to generated current, and a third of said solenoids opposing the other two and being adjustable to selectively provide ampere-turns greater and less than the combined ampere-turns of the said other two solenoids and means for simultaneously so adjusting said third coil and for selectively causing said motor to operate in the corresponding synchronous or subsynchronous speed range.

11. In a motor- and generator-field-control system, the improvement comprising a variable resistance in series connection in the field circuit, a motor, a plurality of solenoids operable to vary said resistance, one of said solenoids being responsive to motor speed, another of said solenoids being responsive to generated current, and a third of said solenoids opposing the other two and being adjustable to selectively provide ampere-turns greater and less than the combined ampere-turns of the said other two solenoids, and means for simultaneously so adjusting said third coil and for selectively causing said motor to operate in the corresponding synchronous or subsynchronous speed range, and damping means associated with said solenoid-operated variable resistance for preventing hunting of said variable resistance.

12. In a motor- and generator-field-control system, the improvement comprising a variable resistance in series connection in the field circuit, a motor, a plurality of solenoids operable to vary said resistance, one of said solenoids being responsive to motor speed, another of said solenoids being responsive to generated current, and a third of said solenoids opposing the other two and being adjustable to selectively provide ampere-turns greater and less than the combined ampere-turns of the said other two solenoids, and means for simultaneously so adjusting said third coil and for selectively causing said motor to operate in the corresponding synchronous or subsynchronous speed range, a damping transformer associated with said solenoid-operated variable resistance for preventing hunting of said variable resistance, and means for selectively reversing the direction of current flow through the primary of said transformer.

13. In a propulsion system, in combination, a prime mover, an alternating-current generator mechanically coupled thereto, a motor selectively operable as a synchronous and as an induction motor and energizable from said generator, field windings for said motor and generator, separate exciters for each of said field windings, field windings for each of said exciters connected in parallel to a source of direct current, means for selectively securing a speed range for said motor extending above and below synchronous speed of the said motor corresponding to idling speed of said engine, field-control means for manually adjusting motor- and generator-exciter fields, automatic field control means associated with said manually-operated control means comprising a variable resistor in series connection with said motor- and generator-exciter fields, means responsive to motor speed and to generated current for automatically varying the resistance of said variable resistor so as to vary generator-field excitation to provide a constant motor speed during subsynchronous operation and to provide such generator-field excitation as is required for stability during synchronous operation for each setting of the said manually-operated control means.

14. In a propulsion system, in combination, a prime mover, an alternating-current generator mechanically coupled thereto, a motor selectively operable as a synchronous and as an induction motor and energizable from said generator, field windings for said motor and generator, separate exciters for each of said field windings, field windings for each of said exciters connected in parallel to a source of direct current, means for selectively securing a speed range for said motor extending above and below synchronous speed of said motor at idling speed of said engine, field-control means for manually adjusting motor- and generator-exciter fields, automatic field-control means associated with said manually-operated field-control means including a solenoid-operated variable resistor in series with the said motor- and generator-exciter fields, solenoid means consisting of a plurality of coils about a common core-and-armature system for varying said variable resistor, the ampere-turns of one of said coils being responsive to motor speed, the ampere-turns of another of said coils being responsive to current flowing between said generator and motor, and the ampere-turns in a third of said coils being responsive to prime mover speed, the said third coil being arranged to oppose the other two, means for adjusting the ampere-turns in the said third coil and such that the ampere-turns in said third coil are selectively greater than the combined ampere-turns of the said other two coils during operation in one of said speed ranges and less than the combined ampere-turns in the said other two coils during operation in the other speed range, such that an increase in motor speed and generated current acts to increase resistance of said variable resistor in the subsynchronous speed range but to decrease resistance of said variable resistor in the synchronous speed range.

HERMAN H. CURRY.

REFERENCES CITED

The following references are of record in the file of this patent:

UNITED STATES PATENTS

| Number | Name | Date |
| --- | --- | --- |
| 1,754,021 | Jewitt | Apr. 8, 1930 |
| 1,948,749 | Evans | Feb. 27, 1934 |
| 2,357,086 | Crever | Aug. 29, 1944 |
| 2,357,087 | Alexanderson | Aug. 29, 1944 |

FOREIGN PATENTS

| Number | Country | Date |
| --- | --- | --- |
| 10,420 | Great Britain | July 17, 1915 |
| 353,893 | Great Britain | July 22, 1931 |